United States Patent
Bhide et al.

(10) Patent No.: US 10,678,413 B2
(45) Date of Patent: *Jun. 9, 2020

(54) APPLICATION FOR AUTO DELETION OF IMAGES

(71) Applicant: International Business Machines Corporation, Armonk, NY (US)

(72) Inventors: Manish A. Bhide, Hyderabad (IN); Anil K. Thiramdas, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,067

(22) Filed: Jun. 7, 2016

(65) Prior Publication Data

US 2017/0046340 A1    Feb. 16, 2017

Related U.S. Application Data

(63) Continuation of application No. 14/825,070, filed on Aug. 12, 2015, now Pat. No. 10,545,650.

(51) Int. Cl.
*G06F 3/0484* (2013.01)
*G06F 16/51* (2019.01)
(Continued)

(52) U.S. Cl.
CPC ........ *G06F 3/04847* (2013.01); *G06F 16/162* (2019.01); *G06F 16/51* (2019.01); *G06F 16/583* (2019.01); *G06K 9/6215* (2013.01)

(58) Field of Classification Search
CPC ........... G06F 3/04847; G06F 17/30117; G06F 17/30247; G06F 17/3028; G06K 9/6215
See application file for complete search history.

(56) References Cited

U.S. PATENT DOCUMENTS 7,363,235 B2    4/2008  Urabe et al.
8,706,689 B1 *  4/2014  Adam ................. G06Q 10/101
                                                 707/616
(Continued)

FOREIGN PATENT DOCUMENTS

EP      2362592 A1    8/2011

OTHER PUBLICATIONS

IBM, "List of IBM Patents or Patent Applications Treated as Related (Appendix P)," Jun. 7, 2016, p. 1-2.
(Continued)

*Primary Examiner* — Jennifer N To
*Assistant Examiner* — Ashley M Fortino
(74) *Attorney, Agent, or Firm* — L. Jeffrey Kelly

(57) ABSTRACT

A method to automatically delete an image stored on a computing device is provided. The method may include, in response to a trigger event, scanning a plurality of images stored on the computing device. The method may also include determining if at least one image within the scanned plurality of images matches a plurality of predetermined criteria or a predetermined threshold. The method may further include marking the at least one image for deletion based on the determination that the at least one image matches the plurality of predetermined criteria or the predetermined threshold. The method may include adding the marked at least one image to an auto delete list. The method may also include displaying the auto delete list to a user.

4 Claims, 5 Drawing Sheets

(51) Int. Cl.
*G06F 16/583* (2019.01)
*G06F 16/16* (2019.01)
*G06K 9/62* (2006.01)

(56) References Cited

U.S. PATENT DOCUMENTS

| | | | | |
|---|---|---|---|---|
| 9,641,746 B2* | 5/2017 | Tsunoda | ............... | H04N 1/2145 |
| 2005/0132010 A1* | 6/2005 | Muller | ................ | G06Q 10/107 |
| | | | | 709/206 |
| 2006/0029296 A1* | 2/2006 | King | ................. | G06Q 30/0643 |
| | | | | 382/313 |
| 2007/0216775 A1* | 9/2007 | Yokota | ............... | H04N 1/00127 |
| | | | | 348/222.1 |
| 2008/0192129 A1* | 8/2008 | Walker | ................ | G11B 27/034 |
| | | | | 348/231.2 |
| 2010/0157340 A1* | 6/2010 | Chen | ................. | G06K 9/00456 |
| | | | | 358/1.9 |
| 2011/0016164 A1* | 1/2011 | Maeshima | .......... | G06F 17/3028 |
| | | | | 707/813 |
| 2012/0201458 A1 | 8/2012 | Narayanan | | |
| 2014/0286627 A1 | 9/2014 | Kato | | |
| 2015/0062652 A1 | 3/2015 | Kawai et al. | | |
| 2016/0239519 A1* | 8/2016 | Levy | ...................... | G06T 5/003 |

OTHER PUBLICATIONS

Bhide et al., "Application for Auto Deletion of Images," Application and Drawings, filed Aug. 12, 2015, 29 Pages, U.S. Appl. No. 14/825,070.

Free-Ocr.com, "Welcome to Free OCR," Free Online OCR, p. 1, http://www.free-ocr.com/, Accessed on Apr. 29, 2015.

GEMED MBH, "GEMED Mobile," App Store on iTunes, Last Updated Dec. 11, 2014, p. 1-2, Version 1.2.4, https:itunes.apple.com/ch/app/gemed-mobile/id564146529?I=en&mt=8, Accessed on Apr. 29, 2015.

Mell et al., "The NIST Definition of Cloud Computing," National Institute of Standards and Technology, Sep. 2011, p. 1-3, Special Publication 800-145.

* cited by examiner

APPLICATION FOR AUTO DELETION OF IMAGES

BACKGROUND

The present invention relates generally to the field of computers, and more particularly to images stored on a computing device.

Today it is very common for people to carry a mobile device, such as a smart phone or tablet, and to use the mobile device to take pictures. Very often, people take temporary photos with the intention of deleting the temporary photo at a later time. However, many photos may never be deleted from the mobile device even though the photo may have been taken with the intention of being a "temporary" photo that will be deleted at a later time.

SUMMARY

According to one embodiment, a method to automatically delete an image stored on a computing device is provided. The method may include in response to a trigger event, scanning a plurality of images stored on the computing device. The method may also include determining if at least one image within the scanned plurality of images matches a plurality of predetermined criteria or a predetermined threshold. The method may further include marking the at least one image for deletion based on the determination that the at least one image matches the plurality of predetermined criteria or the predetermined threshold. The method may include adding the marked at least one image to an auto delete list. The method may also include displaying the auto delete list to a user.

According to another embodiment, a computer system to automatically delete an image stored on a computing device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include in response to a trigger event, scanning a plurality of images stored on the computing device. The method may also include determining if at least one image within the scanned plurality of images matches a plurality of predetermined criteria or a predetermined threshold. The method may further include marking the at least one image for deletion based on the determination that the at least one image matches the plurality of predetermined criteria or the predetermined threshold. The method may include adding the marked at least one image to an auto delete list. The method may also include displaying the auto delete list to a user.

According to yet another embodiment, a computer program product to automatically delete an image stored on a computing device is provided. The computer program product may include one or more computer-readable storage devices and program instructions stored on at least one of the one or more tangible storage devices, the program instructions executable by a processor. The computer program product may include program instructions to, in response to a trigger event, scan a plurality of images stored on the computing device. The computer program product may also include program instructions to determine if at least one image within the scanned plurality of images matches a plurality of predetermined criteria or a predetermined threshold. The computer program product may further include program instructions to mark the at least one image for deletion based on the determination that the at least one image matches the plurality of predetermined criteria or the predetermined threshold. The computer program product may include program instructions to add the marked at least one image to an auto delete list. The computer program product may also include program instructions to display the auto delete list to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
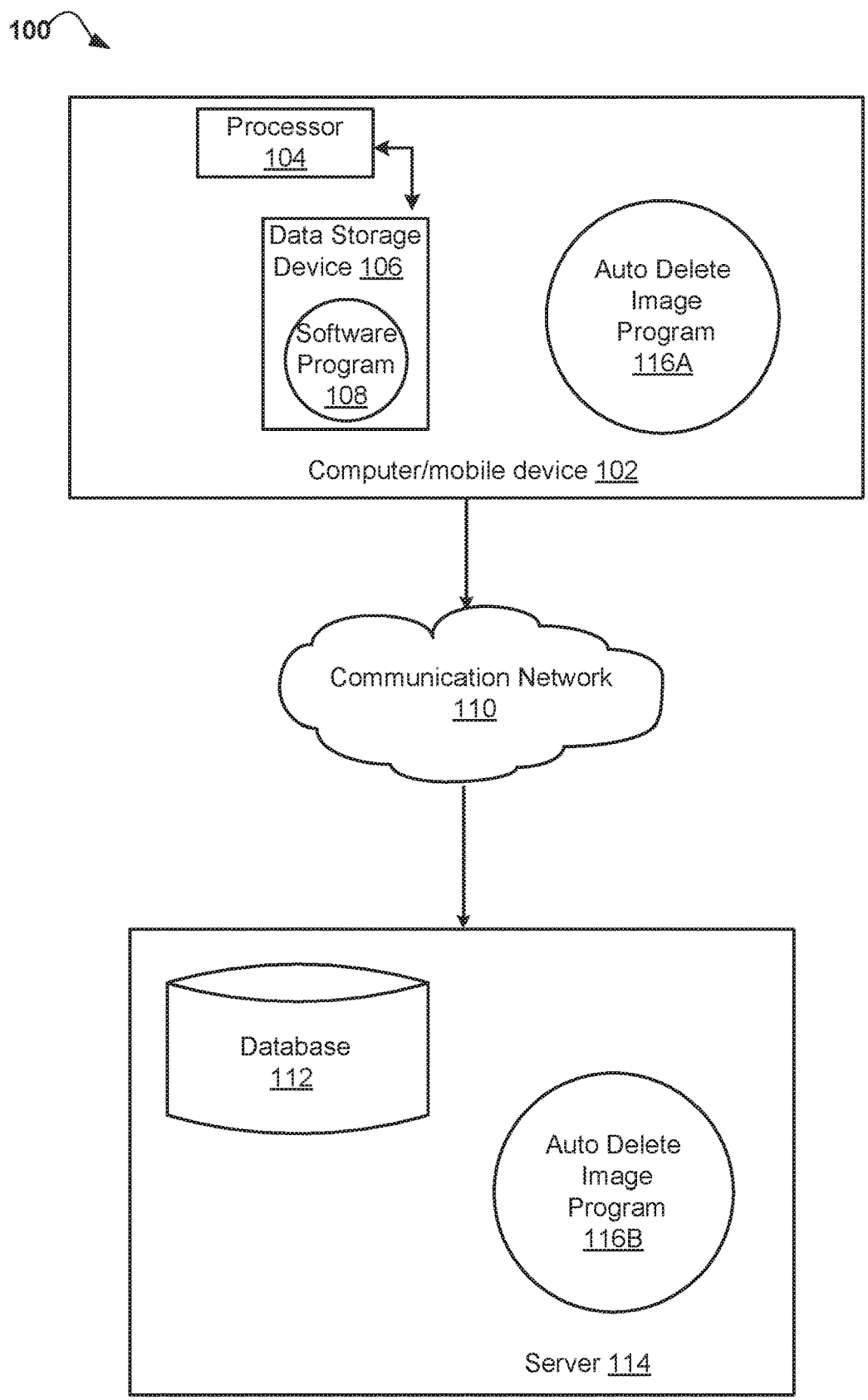
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to images stored on a computing device, such as a mobile device. The following described exemplary embodiments provide a system, method and program product to, among other things, auto delete images stored on a computing device, such as mobile device (e.g., a smart phone or a tablet). Therefore, the present embodiment has the capacity to improve the technical field of mobile applications (or computer programs) that manage image deletions stored on a computing device by enabling a user to auto manage images (i.e., an image, picture, or photo (with or without text) that has been stored on the computing device). Additionally, the present embodiment may mark images for deletion based on a predefined criteria and may display the marked images to a user. For example, the pictures that may be marked for deletion may be a picture with handwritten text, a picture with no face or person depicted in it, or a picture without any scenery or animals, such as pets. Furthermore, the present embodiment may also have a feature to allow the user to decide how to use text pictures as well.

As previously described, it is very common for people to carry a mobile device and to use the mobile device to take a temporary photo with the intention of deleting the temporary photo at a later time. For example, sometimes, a person may take pictures of a grocery item or some other item as a temporary photo and may want to delete it later, however they never do. Similarly, a person may take pictures of meeting notes or papers that may contain text and which may not need to be stored for a long time. Therefore, many photos may never be deleted from the mobile device or the device where the photos are stored even though the photo may have been taken with the intention of being a "temporary" photo that will be deleted at a later time. Furthermore, it may be difficult for a person to identify which images stored on the device should be deleted or how the text pictures should be used. As such, it may be advantageous, among other things, to provide a way to auto delete images stored on a device, such as a mobile device, based on a predefined criteria or a predetermined threshold.

According to at least one implementation, the present embodiment may be an application program that automatically scan images stored on a computing device, such as a mobile device and mark images based on a predefined criteria or a predetermined threshold. Then, the marked images may be presented to the user via a user interface (UI) so that the user may select which images should be deleted or how the text images should be used. The pictures which are marked for deletion may be selected based on a predefined criteria (either predefined by the user or the application), such as a picture with handwritten text, a picture with no face, a picture with no person in it and a picture without any scenery. Additionally, the present embodiment may also provide a feature for the user to decide how to use the text pictures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to auto delete images stored on a computing device, such as a mobile device.

As previously described, according to at least one implementation, the present embodiment may automatically scan images stored on a computing device, such as a mobile device and mark images based on a predefined criteria or a predetermined threshold. Then, the user may see all the images that have been auto marked for deletion. For example, the images that have been marked may be an image with handwritten text, an image with no face or no person in it, an image without any scenery, or an image that is all text. Additionally, the present embodiment may provide a feature that allows the user to decide how to use the text images.

For example, according to at least one implementation, the present embodiment may be implemented as an application on a mobile device, such as a smart phone or a tablet and may be designed (i.e., preconfigured based on the predetermined criteria or predetermined thresholds) for auto detecting pictures with text, without a person and without scenery in it. The application can be deployed or installed on mobile devices, tablets, and cameras and can be extended to various computer devices running various operating systems that have stored images associated with the computer device.

With respect to the above example, this application may auto scan the existing photos and list out all the photos which do not have a person in it. According to at least one implementation, purely text images may not be added to the application the first time the user takes a picture of a text. However, if the user opens or uses the text picture, then the application may mark the text picture for deletion. Additionally, the present embodiment may set a trigger on the user gallery and when a picture is taken, the application may auto scan and act accordingly. Therefore, predetermined criteria may include rules and thresholds, such as the picture will only be added to the deletion list if the user opens the picture at least once and the default threshold for an image to be deleted may be set for after n (e.g., 30) days unless the user modifies the setting.

A user may be prompted via a graphical user interface (GUI) that may be displayed as a pop-up window which may prompt the user as to whether to delete the photo or not. Then, the user may either choose to add additional days for the photo to be available or the user can delete the photo by selecting yes. Existing technology and algorithms will be used for scanning the pictures to find the predetermine criteria (e.g., finding a person, text, and scenery on an image).

Referring to FIG. 1, an exemplary networked computer environment 100 in accordance with one embodiment is depicted. The networked computer environment 100 may include a computer/mobile device 102 with a processor 104 and a data storage device 106 that is enabled to run a software program 108, such as a web application (a web application is any software that runs in a web browser) and an Auto Delete Image Program 116A. The networked computer environment 100 may also include a server 114 that is enabled to run an Auto Delete Image Program 116B that may interact with a database 112 and a communication network 110. The networked computer environment 100 may include a plurality of computer/mobile device 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer/mobile device 102 may communicate with the Auto Delete Image Program 116B running on server computer 114 via the communications network 110. The communications network 110 may include connections, such as wire, wireless communication links, or fiber optic cables. As will be discussed with reference to FIG. 3, server computer 114 may include internal components 800*a* and external components 900*a*, respectively, and client computer/mobile device 102 may include internal components 800*b* and external components 900*b*, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer/mobile device 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Auto Delete Image Program 116A, 116B may interact with a database 112 that may be embedded in various storage devices, such as, but not limited to a computer/mobile device 102, a networked server 114, or a cloud storage service.

As previously described, the client computer/mobile device 102 may access the Auto Delete Image Program 116B, running on server computer 114 via the communications network 110. For example, a user using a client computer/mobile device 102 may access the Auto Delete Image Program 116A, 116B, running on client computer/mobile device 102, and server computer 114, respectively via the communications network 110. For example, a user using client computer/mobile device 102 may connect via a communication network 110 to the Auto Delete Image Program 116B which may be running on server computer 114. The user may utilize the Auto Delete Image Program 116A, 116B to automatically mark pictures stored on the computer/mobile device 102 so that the marked pictures may be selected for auto deletion.

As previously explained, according to at least one implementation, the present embodiment may be an application for auto deleting images from a computing device 102, such as a mobile device 102. A user may have this application (i.e., the Auto Delete Image Program 116A, 116B) for use across multiple computing devices. The Auto Delete Image Program 116A, 116B may automatically scan and mark the user's existing and newly captured images for deletion based on certain criteria. For example, images may be marked for deletion based on the image containing text only, or the image not containing people or scenery. The user may also select additional criteria for an image to be marked for deletion. Additionally, according to one implementation, text may be extracted from an image so that it may be easily read or edited by the user. Then these images may automatically be deleted based on a predetermined threshold, such as after a thirty day period, or any time period set by the user. Furthermore, the present embodiment may only mark an image for deletion after the user has accessed, or viewed, the image. When an image is ready to be deleted, the user may be prompted to confirm deletion of the image, for example with a pop-up window via a graphical user interface (GUI) on their computer/mobile device 102. The user may then be able to decide how the deletion of the image or storage of the image may be handled. For example, the user may confirm deletion of the image, choose an additional number of days for the image to be available, or remove the image from the list of temporary images marked for deletion via the GUI. The Auto Delete Image method is explained in more detail below with respect to FIG. 2.

Figure 2:
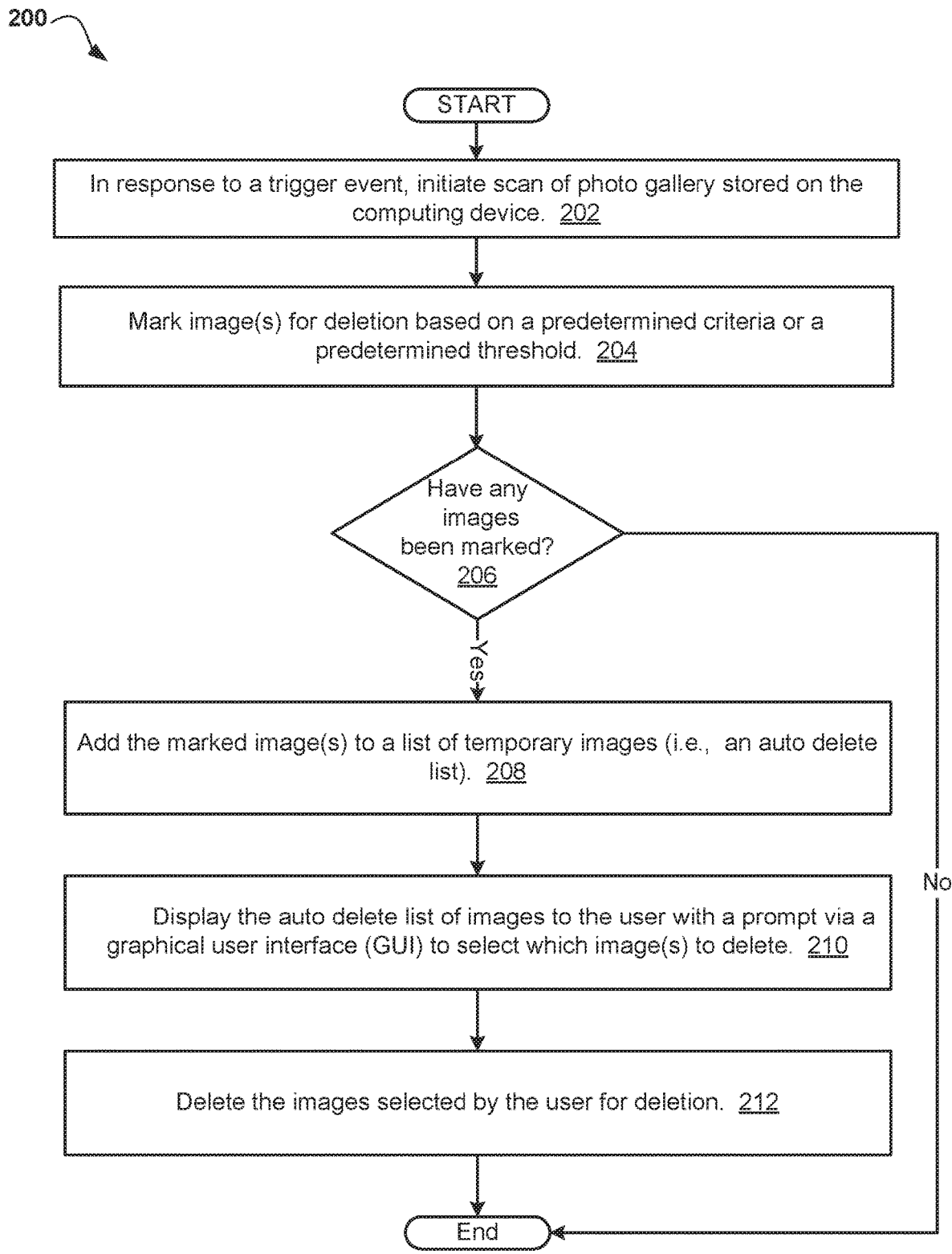
FIG. 2 is an operational flowchart illustrating the steps carried out by a program to automatically delete or mark for deletion an image stored on a computing device according to a predetermined criteria or a predetermined threshold according to one embodiment.

Referring now to FIG. 2, an operational flowchart 200 illustrating the steps carried out by a program to automatically delete or mark for deletion an image stored on a computing device according to a predetermined criteria or a predetermined threshold in accordance with one embodiment is depicted. As previously described, the Auto Delete Image Program 116A, 116B (FIG. 1) may scan images (i.e., pictures or photos) in a photo gallery stored on a computing device, such as a mobile device and mark the image for deletion when the application did not find a person in the picture or when the application did not find text or scenery in the picture. The user can set the threshold for deletion. By default the application may set a 30 day threshold, however, the threshold may be modified. The application can be installed on smart phones, tablets, and various computer devices running various operating systems.

Therefore with respect to FIG. 2 at 202, the Auto Delete Image Program 116A, 116B (FIG. 1), in response to a trigger event, initiates a scan of a photo gallery stored on a computing device to mark images for deletion. According to at least one implementation, the trigger event may include a scan to automatically run based on a predefined condition being met or satisfied, such as a threshold setting of automatically running a scan every 30 days. Additionally, a trigger event may include a manual initiation of a scan by a user.

Next, at 204, the Auto Delete Image Program 116A, 116B (FIG. 1) marks an image for deletion based on predetermined criteria or threshold settings that have been satisfied. For example, the Auto Delete Image Program 116A, 116B (FIG. 1) may mark images such as a picture that is greater than n (e.g., 30) days old (by default the application may set a 30 day threshold which may be customized by the user), a picture with no person, a picture with no scenery, and a picture with text. As such, the present embodiment may scan each and every picture and mark the picture for deletion when the application did not find a person in the picture or when the application finds text only in the image or when it did not find any scenery in the picture. Additionally, an image may be marked for deletion after a user has visited a location based on GPS where the picture is used (e.g., away from home in a super market, or any other shop).

Then, at 206, the Auto Delete Image Program 116A, 116B (FIG. 1) determines whether any images have been marked for deletion. If at 206 it is determined that no images were marked for deletion, then the method may end. However, if at 206 it is determined that images were marked for deletion, then the method will continue to step 208.

Next, at 208, the Auto Delete Image Program 116A, 116B (FIG. 1) adds the marked photos to list of temporary photos (i.e., an auto delete list). According to at least one implementation, the Auto Delete Image Program 116A, 116B (FIG. 1) may automatically mark a text picture for deletion after a user opens the picture at least once, as such, images may be automatically added to the auto delete list based on a predetermined criteria or threshold being met.

Then, at 210, the Auto Delete Image Program 116A, 116B (FIG. 1) displays the auto delete list of images to the user. As previously described, a trigger may be set for the gallery that may automatically run the scan and automatically create an auto delete list of images to be displayed to the user. A user may be prompted via a graphical user interface (GUI) that is displayed as a pop-up window which may prompt the user as to whether to delete the photo or not. According to at least one implementation, the user may either choose to add additional days for the photo to be available or the user can delete the photo by selecting yes. Existing technology and algorithms may be used for scanning the pictures to find the predetermined criteria or to determine whether the predetermined threshold has been met (e.g., finding a person, text, or scenery on an image and determining if the image has exceeded its expiration date).

Next, at 212, the Auto Delete Image Program 116A, 116B (FIG. 1) deletes the images selected by the user to be deleted or adds additional time to the expiration of the image as indicated by the user.

It may be appreciated that FIG. 2 provides only an illustration of one implementation and does not imply any limitations with regard to how different embodiments may be implemented. Many modifications to the depicted environments may be made based on design and implementation requirements. For example, as previously described, according to at least one implementation, the predetermined criteria and thresholds may be set or modified by a user or predetermined by the application. The predetermined criteria may include, but is not limited to auto deleting (or marking) a picture with no person, with no scenery or animals, or with text and adding the picture to a list of temporary photos. Predetermined thresholds may include to delete pictures after n number of days. The present embodiment may include setting triggers to the photo gallery that make the application automatically scan the pictures and add pictures to an auto delete list of the application. Additionally, a text picture may be marked for deletion after user opens the picture at least once.

Figure 3:
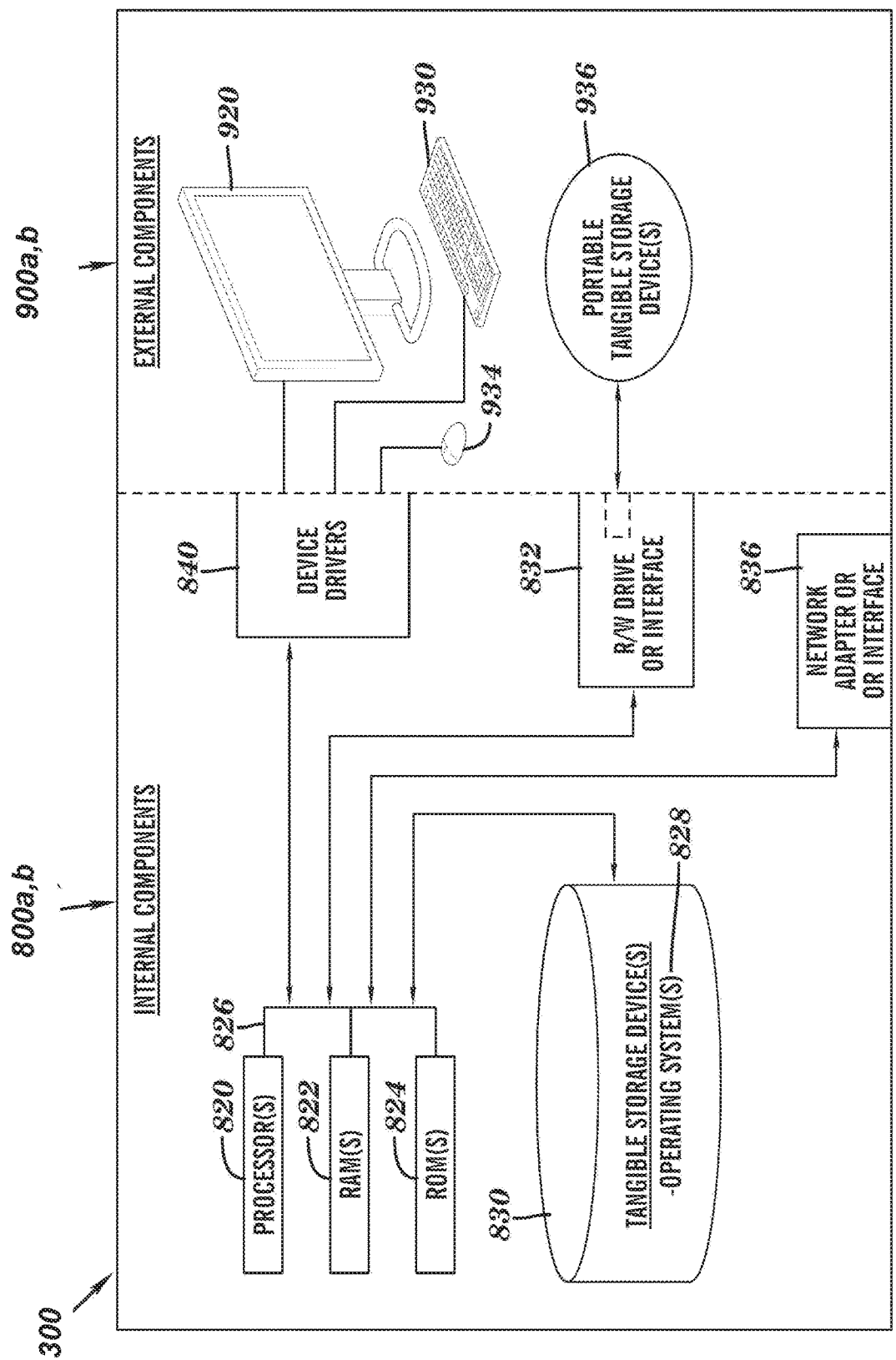
FIG. 3 is a block diagram of internal and external components of computers and servers depicted in FIG. 1 according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer/mobile device 102 (FIG. 1) and network server 114 (FIG. 1) may include respective sets of internal components 800a,b and external components 900a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Auto Delete Image Program 116A (FIG. 1) in client computer/mobile device 102 (FIG. 1) and the Auto Delete Image Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Auto Delete Image Program 116A, 116B (FIG. 1) can be stored on one or more of the respective portable computer-readable tangible storage devices 936, read via the respective R/W drive or interface 832 and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Auto Delete Image Program 116A (FIG. 1) in client computer/mobile device 102 (FIG. 1) and the Auto Delete Image Program 116B (FIG. 1) in network server 114 (FIG. 1) can be downloaded to client computer/mobile device 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Auto Delete Image Program 116A (FIG. 1) in client computer/mobile device 102 (FIG. 1) and the Auto Delete Image Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
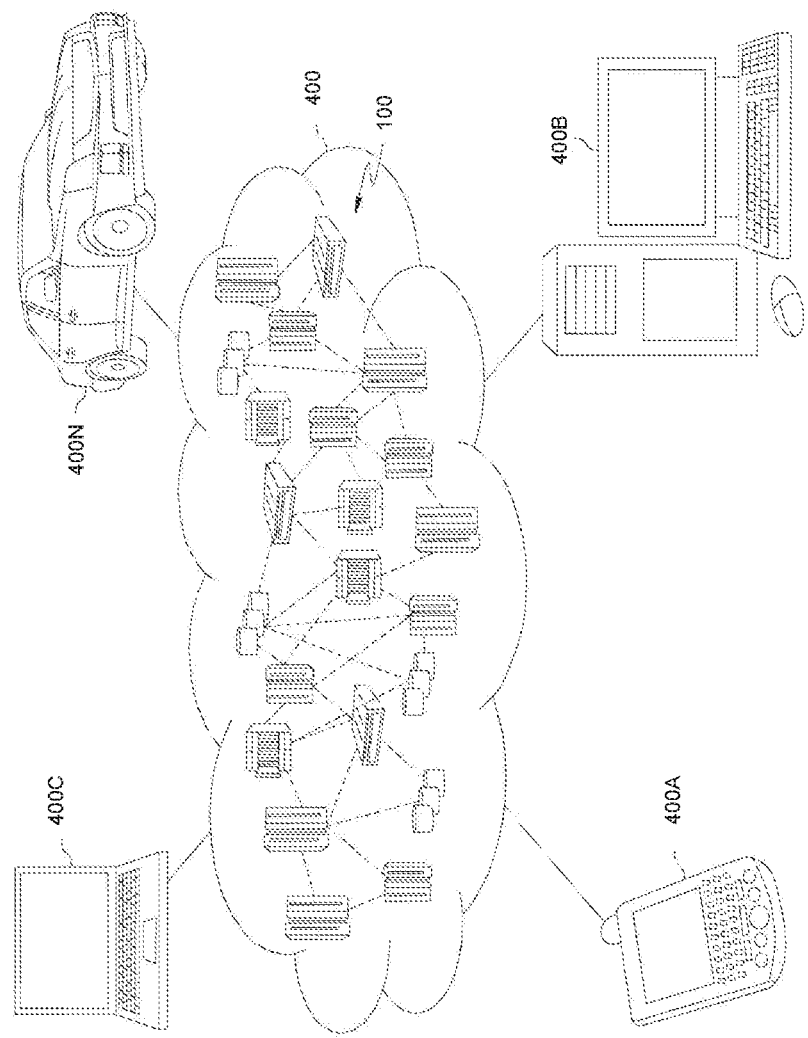
FIG. 4 is a block diagram of an illustrative cloud computing environment including the computer system depicted in FIG. 1, according to one embodiment.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
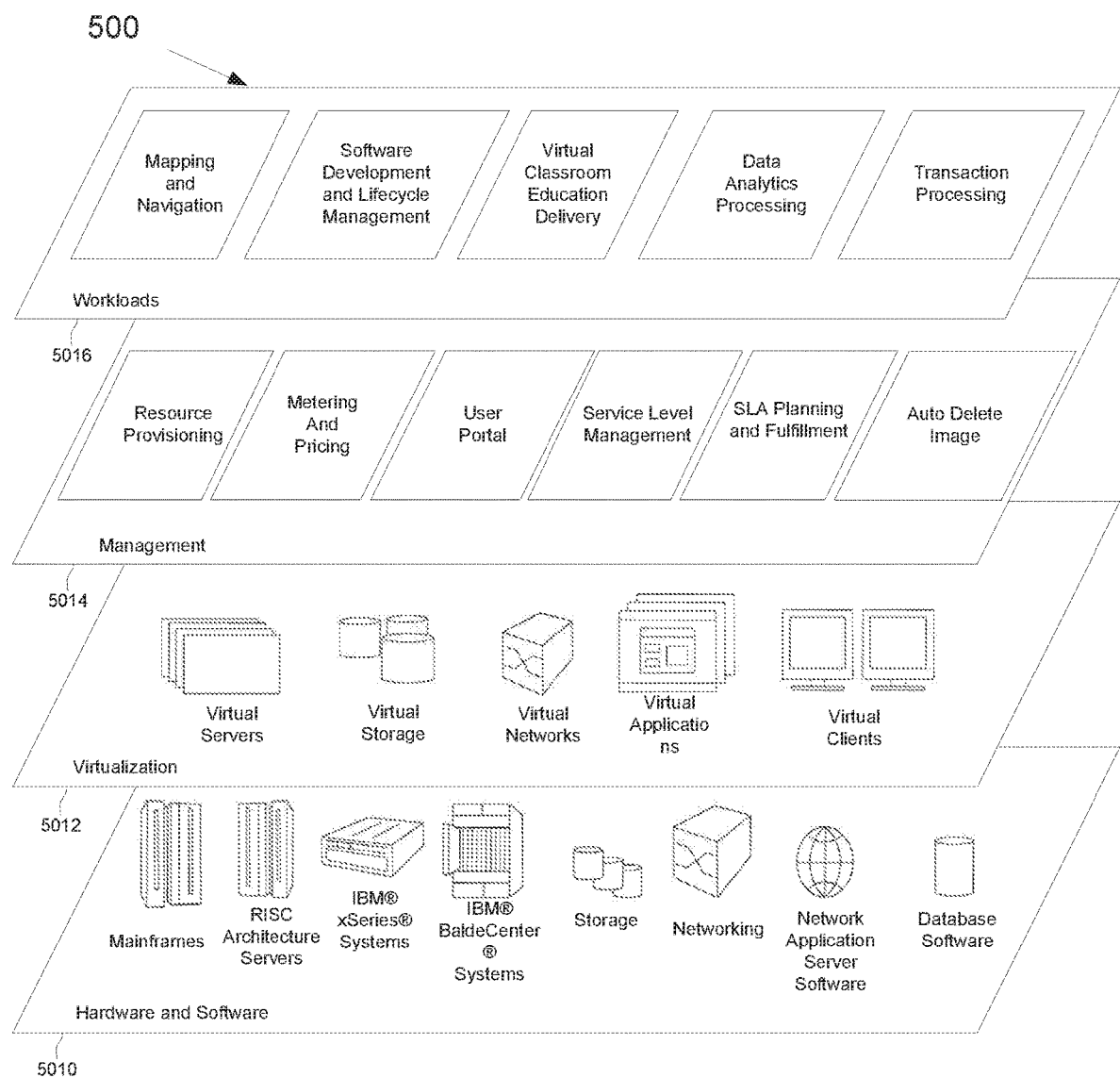
FIG. 5 is a block diagram of functional layers of the illustrative cloud computing environment of FIG. 4, according to one embodiment.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Auto Delete Image Program may provide a capability to mobile enable web applications that are not natively developed for mobile devices, such as smart phones.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to identify one or more images stored on a computing device of a user is intended, at a capture time, to be temporarily stored on the computing device and remove the one or more identified images from a memory of the computing device to increase storage space and processing speed of the computing device, the method comprising:

in response to an iterative time period expiring, scanning a plurality of images stored on the computing device;

determining, automatically, if at least one image within the scanned plurality of images matches each of a plurality of predetermined criteria and a predetermined time threshold since each at least one image was captured, wherein the plurality of predetermined criteria comprises determining if the at least one image contains only a text image, the at least one image not containing people or scenery, and the user has visited a predetermined location;

marking the at least one image for deletion based on the determination that the at least one image matches the plurality of predetermined criteria and the predetermined threshold;

extracting text from the at least one image;

providing the text from the at least one image in an editable form to the user;

determining the marked at least one image has been accessed by the user;

adding the marked at least one image to an auto delete list, based on the determination that the marked at least one image has been accessed by the user;

displaying the auto delete list to a user;

removing an image on the displayed auto delete list from the auto delete list based on user interactions;

prompting the user, via the graphical user interface (GUI), to add an additional number of days for an expiration date associated with the based on the user interactions;

deleting each remaining image on the displayed auto delete list from the memory of the computing device; and in response to user interactions to delete the image on the expiration date, deleting the image from the memory of the computing device.

2. The method of claim 1, further comprising:

prompting the user, via the GUI, to determine whether an image displayed within the auto delete list is selected to be deleted.

3. The method of claim 1, wherein the predetermined criteria comprises marking an image that includes at least one of an image without a person in it, an image without any scenery, and an image that contains text.

4. The method of claim 1, wherein the predetermined threshold comprises marking an image that has been stored for a predetermined number of days.

* * * * *